United States Patent
Ackermann et al.

(10) Patent No.: US 10,762,082 B2
(45) Date of Patent: Sep. 1, 2020

(54) SYSTEM AND METHOD FOR AUGMENTING ANSWERS FROM A QA SYSTEM WITH ADDITIONAL TEMPORAL AND GEOGRAPHIC INFORMATION

(71) Applicant: INTERNATIONAL BUSINESS MACHINES CORPORATION, Armonk, NY (US)

(72) Inventors: Chris F. Ackermann, Fairfax, VA (US); Charles E. Beller, Baltimore, MD (US); Stephen A. Boxwell, Columbus, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/399,164

(22) Filed: Jan. 5, 2017

(65) Prior Publication Data
US 2018/0217989 A1 Aug. 2, 2018

(51) Int. Cl.
*G06F 16/2452* (2019.01)
*G09B 7/02* (2006.01)
(Continued)

(52) U.S. Cl.
CPC .... *G06F 16/24522* (2019.01); *G06F 16/2465* (2019.01); *G06F 16/2477* (2019.01);
(Continued)

(58) Field of Classification Search
CPC .......... G06F 17/30551; G06F 17/3053; G06F 16/248; G06F 16/9038; G06F 16/2452; G06F 16/24578; G06F 16/487; G06F 16/3329; G06F 16/334; G06F 16/3344; G06F 16/338; G06F 16/2477; G06F 16/9537; G06F 16/2428; G06F 16/683
See application file for complete search history.

(56) References Cited

U.S. PATENT DOCUMENTS

2010/0145976 A1 6/2010 Higgins et al.
2010/0250578 A1* 9/2010 Athsani ............ G06F 17/30867
707/765

(Continued)

OTHER PUBLICATIONS

"List of IBM Patents or Applications Treated as Related", dated Aug. 26, 2019, 2 pages.

(Continued)

*Primary Examiner* — Yuk Ting Choi
(74) *Attorney, Agent, or Firm* — Conley Rose, P.C.

(57) ABSTRACT

A system includes a question processing circuit, an answer processing circuit, a mining circuit, and a question determination circuit. The question processing circuit is configured to receive a first question. The answer processing circuit is configured to generate a first answer set corresponding to the first question. The first answer set corresponds with one or more evidence passages. The mining circuit is configured to mine the evidence passages to identify a geospatial or temporal modifier. The question determination circuit is configured to generate a second question based on the first question and the geospatial or temporal modifier. The answer processing circuit is further configured to generate a second answer set corresponding to the second question and return a question answer set based on the second answer set to a user.

8 Claims, 7 Drawing Sheets

(51) Int. Cl.
*H04W 4/18* (2009.01)
*G06F 16/2458* (2019.01)
*G06F 16/332* (2019.01)
*G06F 16/9537* (2019.01)
*G06F 16/2457* (2019.01)
*G06N 5/00* (2006.01)
*G06F 17/10* (2006.01)

(52) U.S. Cl.
CPC .... *G06F 16/24578* (2019.01); *G06F 16/3325* (2019.01); *G06F 16/9537* (2019.01); *G06N 5/00* (2013.01); *G09B 7/02* (2013.01); *H04W 4/185* (2013.01); *G06F 17/10* (2013.01)

(56) References Cited

U.S. PATENT DOCUMENTS

| | | | | |
|---|---|---|---|---|
| 2011/0125734 | A1* | 5/2011 | Duboue | G09B 7/00 707/723 |
| 2012/0078938 | A1* | 3/2012 | Davis | G06F 16/3322 707/767 |
| 2015/0026163 | A1* | 1/2015 | Haggar | G06F 17/30654 707/723 |
| 2015/0170054 | A1 | 6/2015 | Allen et al. | |
| 2015/0235131 | A1 | 8/2015 | Allen et al. | |
| 2015/0293917 | A1* | 10/2015 | Bufe, III | G06F 17/30867 706/12 |
| 2015/0356170 | A1* | 12/2015 | Allen | G06F 17/30654 707/725 |
| 2016/0162492 | A1 | 6/2016 | Bufe, III et al. | |
| 2016/0180726 | A1 | 6/2016 | Ahuja et al. | |
| 2018/0075162 | A1* | 3/2018 | Ni | G06F 17/3064 707/999.003 |

OTHER PUBLICATIONS

Office Action dated Jul. 15, 2019 U.S. Appl. No. 15/627,179, filed Jun. 19, 2017, 23 pages.

* cited by examiner

SYSTEM AND METHOD FOR AUGMENTING ANSWERS FROM A QA SYSTEM WITH ADDITIONAL TEMPORAL AND GEOGRAPHIC INFORMATION

STATEMENT REGARDING FEDERALLY SPONSORED RESEARCH OR DEVELOPMENT

This invention was made with Government support under Agreement No. 2013-12101100008 awarded by The Department of Defense. The Government has certain rights to this invention.

STATEMENT REGARDING PRIOR DISCLOSURES BY THE INVENTOR OR A JOINT INVENTOR

N/A.

BACKGROUND

The present invention relates to cognitive computing systems, and more specifically, to techniques and mechanisms for improving the results generated by a Question and Answer system by utilizing temporal and geographic information.

With the increased usage of computing networks, such as the Internet, users can easily be overwhelmed with the amount of information available from various structured and unstructured sources. However, information gaps abound as users try to piece together what they believe to be relevant during searches for information on various subjects. To assist with such searches, research has been directed to creating cognitive systems such as Question and Answer (QA) systems that take an input question, analyze the question, and return results indicative of the most probable answer or answers to the input question. QA systems provide automated mechanisms for searching through large sets of sources of content, e.g., electronic documents, and analyze them with regard to an input question to determine an answer to the question and a confidence measure as to how accurate an answer to the question might be.

The IBM Watson™ system available from International Business Machines (IBM) Corporation of Armonk, N.Y. offers several services that can be used to build such QA systems. The IBM Watson™ system is an application of advanced natural language processing, information retrieval, knowledge representation and reasoning, and machine learning technologies to the field of open domain question answering.

SUMMARY

In an embodiment, a system/apparatus is provided. The system/apparatus includes a question processing circuit, an answer processing circuit, a mining circuit, and a question determination circuit. The question processing circuit is configured to receive a first question. The answer processing circuit is configured to generate a first answer set corresponding to the first question. The first answer set corresponds with one or more evidence passages. The mining circuit is configured to mine the evidence passages to identify a geospatial or temporal modifier. The question determination circuit is configured to generate a second question based on the first question and the geospatial or temporal modifier. The answer processing circuit is further configured to generate a second answer set corresponding to the second question and return a question answer set based on the second answer set to a user. In an embodiment of the system, the answer processing circuit is configured to include the geospatial or temporal modifier utilized to generate the second question in each answer of the second answer set. In an embodiment of the system, the question answer set is the first answer set, the second answer set, or a combination of the first answer set and the second answer set. In an embodiment of the system, the answer processing circuit is configured to generate a confidence score for each answer in the first answer set and each answer in the second answer set. In an embodiment of the system, the answer processing circuit is configured to compare a first confidence score of a first answer in the first answer set to a second confidence score of a second answer in the second answer set. The second answer may correspond to the first answer. In an embodiment of the system, in response to a determination that the second confidence score is greater than the first confidence score, the second answer is included in the question answer set and the first answer is excluded from the question answer set. In an embodiment of the system, the answer processing circuit is configured to sort each answer in the question answer set by confidence score. In an embodiment of the system, the answer processing circuit is configured to return the question answer set in order of greatest confidence score answer to least confidence score answer.

In a further embodiment, a computer program product including a computer readable storage medium encoded with program instructions is provided.

In a further embodiment, a computer program product including a computer readable storage medium encoded with program instructions is provided. The program instructions are executable by a computer to cause the computer to perform various ones of, and various combinations of the operations described above with respect to embodiments of a method.

DETAILED DESCRIPTION

The quality of the responses provided by a QA system is tied to the question provided to the system. However, many questions may be ambiguous and/or have many different possible answers. For example, the question, "Who did George Bush defeat?" may have numerous correct answers from John Kerry and Al Gore for the United States presidential elections of 2004 and 2000, respectively, to Garry Mauro and Ann Richards for the Texas gubernatorial elections of 1998 and 1994, respectively, and to Michael Dukakis for the United States presidential election of 1988. Therefore, it is desirable to develop a system to automatically narrow the provided question to increase the confidence in the answer by the QA system. In accordance with various examples, a system may be provided that narrows natural language questions based on geospatial and/or temporal modifiers associated with answers to an ambiguous question. Answers to the narrower questions then may be returned to users with the geospatial and/or temporal modifiers identified in the answers so that the user is notified how the question was narrowed. In this way, the system may improve natural language processing.

Figure 1:
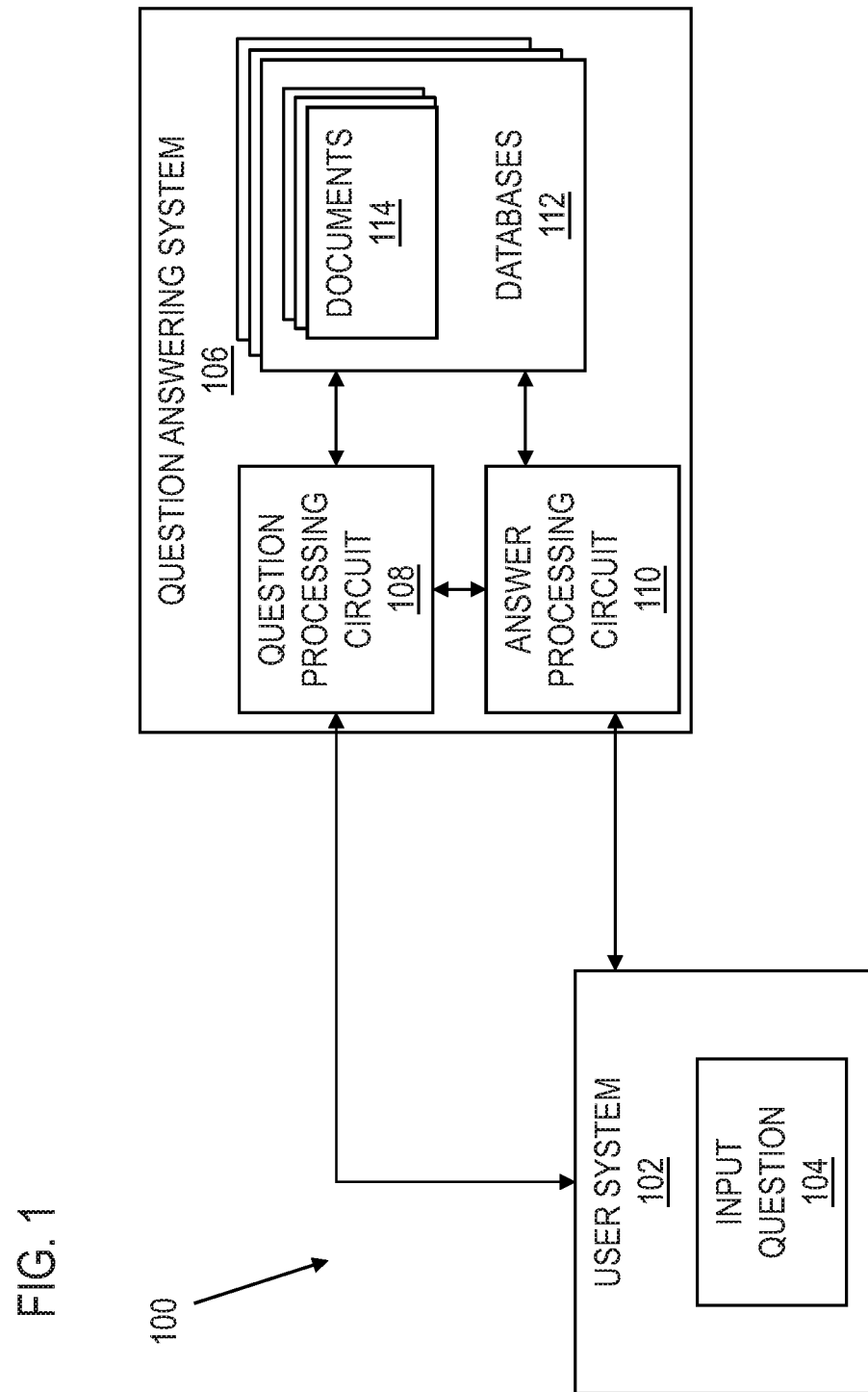
FIG. 1 shows an illustrative block diagram of a system that provides answers to natural language questions in accordance with various embodiments.

FIG. 1 shows a block diagram of a system 100 that answers natural language questions in accordance with various embodiments. The system 100 includes a question answering (QA) system 106 and a user system 102. The QA system 106 is a system configured to answer questions, such as input question 104 received from user system 102. In some embodiments, the question 104 may take the form of a natural language question. For example, the question 104 may be, "Who did George Bush defeat?" The QA system 106 is illustrative and is not intended to state or imply any limitation with regard to the type of QA mechanisms with which various embodiments may be implemented. Many modifications to the example QA system 100 may be implemented in various embodiments.

The system 100, including the QA system 106 and the user system 102, may be implemented on one or more computing devices (comprising one or more processors and one or more memories, and optionally including any other computing device elements generally known in the art including buses, storage devices, communication interfaces, and the like).

The QA system 106 operates by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

The QA system 106 includes question processing circuit 108, answer processing circuit 110, and databases 112. The databases 112 store documents 114 that serve as at least a part of the corpus of content from which answers to questions are derived. The documents 114 may include any file, text, article, or source of data for use in the QA system 106. The question processing circuit 108 receives input questions to be answered by the QA system 106. The input questions may be formed using natural language. The input questions may be received from the user system 102. The user system 102 may be coupled to the QA system 106 via a network, such as a local area network, a wide area network, the internet, or other communication system.

In some illustrative embodiments, the QA system 106 may be the IBM Watson™ QA system available from International Business Machines Corporation of Armonk, N.Y. The IBM Watson™ QA system may receive an input question, such as question 104, which it then parses to extract the major features of the question, that in turn are then used to formulate queries that are applied to the corpus of data. Based on the application of the queries to the corpus of data, a set of hypotheses, or candidate answers to the input question, are generated by looking across the corpus for portions of the corpus of data that have some potential for containing a valuable response to the input question.

The IBM Watson™ QA system analyzes the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the question 104.

The question processing circuit 108 receives input question 104 that is presented in a natural language format. That is, a user of the user system 102 may input, via a user interface, an input question to obtain an answer. For example, a user may input the question, "Who did George Bush defeat?" into the user system 102. In response to receiving the input question from the user system 102, the question processing circuit 108 parses the input question 104 using natural language processing techniques to extract major features from the input question 104, classify the major features according to types, e.g., names, dates, or any of a variety of other defined topics. The identified major features may then be used to decompose the question 104 into one or more queries that may be submitted to the databases 112 in order to generate one or more hypotheses. The queries may be generated in any known or later developed query language, such as the Structure Query Language (SQL), or the like. The queries may be submitted to one or more databases 112 storing the documents 114 and other information.

The queries may be submitted to one or more databases 112 storing information about the electronic texts, documents, articles, websites, and the like, that make up the corpus of data/information. The queries are submitted to the databases 112 to generate results identifying potential hypotheses for answering the input question 104. That is, the submission of the queries results in the extraction of portions of the corpus of data/information matching the criteria of the particular query. These portions of the corpus are analyzed and used to generate hypotheses for answering the input question 104. These hypotheses are also referred to herein as "candidate answers" for the input question 104. For any input question, there may be hundreds of hypotheses or candidate answers generated that need to be evaluated.

The answer processing circuit 110 analyzes and compares the language of the input question 104 and the language of each hypothesis or "candidate answer" as well as performs evidence scoring to evaluate the likelihood that a particular hypothesis is a correct answer for the input question. As mentioned above, this process may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis.

The answer processing circuit 110 may synthesize the large number of relevance scores generated by the various reasoning algorithms into confidence scores for the various hypotheses. This process may involve applying weights to the various scores, where the weights have been determined through training of the statistical model employed by the QA system 106. The weighted scores may be processed in accordance with a statistical model generated through training of the QA system 106 that identifies a manner by which these scores may be combined to generate a confidence score or measure for the individual hypotheses or candidate answers. This confidence score or measure summarizes the level of confidence that the QA system 106 has about the evidence that the candidate answer is inferred by the input question 104, i.e., that the candidate answer is the correct answer for the input question 104.

In the answer processing circuit 110, the resulting confidence scores or measures may be compared against predetermined thresholds, or other analysis may be performed on the confidence scores to determine which hypotheses/candidate answers are most likely to be the answer to the input question 104. The hypotheses/candidate answers may be ranked according to these comparisons to generate a ranked listing of hypotheses/candidate answers (hereafter simply referred to as "candidate answers"). From the ranked listing of candidate answers, a final answer and confidence score, or final set of answers and confidence scores, may be generated and returned to the user system 102.

However, some input questions may be ambiguous and/or have multiple "correct" answers. For example, the question, "Who did George Bush defeat?" may have multiple correct answers because George W. Bush defeated many opponents, notably John Kerry (in the 2004 United States presidential election) and John Kerry (in the 2000 United States presidential election), but also John McCain and Alain Keyes (in the 2000 Republican primary), Garry Mauro (in the 1998 Texas gubernatorial election), and Ann Richards (in the 1994 Texas gubernatorial election). Furthermore, the question could have additional correct answers because George H. W. Bush defeated other opponents (e.g., Michael Dukakis in the 1988 United States presidential election). In order to return the best results to the user system 102 for such questions, the QA system 106 may utilize an iterative process to narrow an ambiguous input question 104 based on geospatial and/or temporal limitations to generate answers with higher confidence scores.

Figure 2:
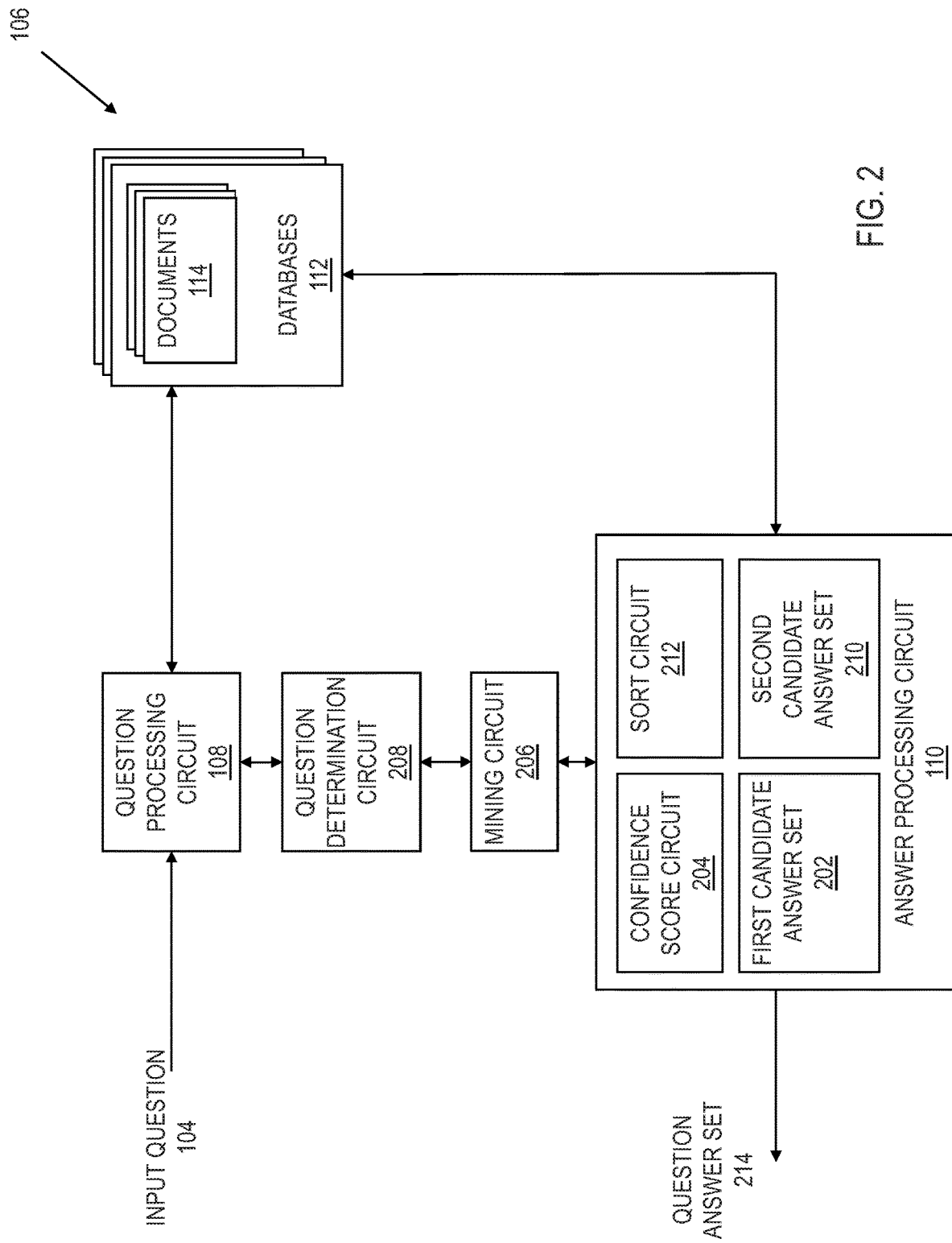
FIG. 2 shows an illustrative block diagram of a question answering system for answering natural language questions in accordance with various embodiments.

FIG. 2 shows an illustrative block diagram of QA system 106 for answering natural language questions in accordance with various embodiments. As discussed above, an input question 104 is received from the user system 102 by the question processing circuit 108. The question processing circuit 108 parses the input question 104 using natural language processing techniques to extract major features from the input question 104 which may then be used to decompose the question 104 into one or more queries that may be submitted to the databases 112 in order to generate one or more hypotheses. The submission of the queries results in the extraction of portions of the corpus of data/information matching the criteria of the particular query. These portions of the corpus are analyzed and used to generate a first set of candidate answers 202 answering the input question 104.

For example, the answer processing circuit 110 may determine a number of candidate answers to the question, "Who did George Bush defeat?" that are included in the first set of candidate answers 202. Thus, the first set of candidate answers 202 in this example may include, John Kerry, Al Gore, John McCain, Alain Keyes, Garry Mauro, Ann Richards, and Michael Dukakis. Along with generating the first set of candidate answers 202, the answer processing circuit 110 may pull evidence passages (text passages) from the databases 112 and documents 114 that provide evidence that supports the particular first set of candidate answers 202. For example, a query submitted to the databases 112 may return portions of the corpus of data/information as an evidence passage that states, "In 2004, John Kerry was defeated by incumbent President George W. Bush." From that evidence passage, the candidate answer John Kerry may be extracted.

The mining circuit 206 may be configured to identify one or more geospatial and/or temporal modifiers in the evidence passages extracted for each of the first set of candidate answers 202. In other words, the mining circuit 206 may be configured to mine (e.g., crawl) the evidence passages associated with each of the first set of candidate answers 202 for geospatial and/or temporal modifiers. Continuing the previous example, the mining circuit 206 may mine the evidence passage supporting the first candidate answer, John Kerry, for geospatial and/or temporal modifiers. In this case, the temporal modifier, "2004" may be mined and extracted from the evidence passage supporting the candidate answer John Kerry. For a candidate answer, Ann Richards, the geospatial modifier, "Texas" may be mined and extracted from an evidence passage that reads, "Ann Richards was defeated by George W. Bush in 1994 to win the Texas governor's race," while the temporal modifier, "1994" is also mined and extracted.

Because the geospatial and/or temporal modifiers are not included in the original input question 104, they do not matter much for determining an answer to the original input question. However, these modifiers do provide particularly important context for the input question 104. Therefore, the geospatial and/or temporal modifiers mined from the evidence passages may be added to the input question 104 and then resubmitted to the question processing circuit 108. Thus, the question determination circuit 208 is configured to generate additional questions to be processed by question processing circuit 108 based on the first question and the geospatial and/or temporal modifier mined by mining circuit 206. For instance, the question determination circuit 208 may combine the first question with any of the mined geospatial and/or temporal modifiers to generate additional questions that are provided to question processing circuit 108 in order to query the databases 112. Thus, continuing the previous examples, the question determination circuit 208 may generate the additional questions, "Who did George Bush defeat in 2004?" from the mined "2004" modifier associated with the candidate answer "John Kerry," "Who did George Bush defeat in 1994?" from the mined "1994" modifier associated with the candidate answer "Ann Richards," and "Who did George Bush defeat in Texas?" from the mined "Texas" modifier associated with "Ann Richards."

In some embodiments, the question determination circuit 208 will generate one additional question for each mined geospatial and/or temporal modifier. Thus, for example, if the mining circuit 206 mines 10 different geospatial and/or temporal modifiers from all of the evidence passages associated with all of the first set of candidate answers 202, then the question determination circuit 208 may generate 10 different questions, one additional question for each identified modifier to be submitted to the question processing circuit 108. In some embodiments, the question determination circuit 208 may generate one additional question for a specified number of geospatial and/or temporal modifiers (e.g., the n-best modifiers). Thus, the question determination circuit 208 may be programmed to generate 5 additional questions, even if the mining circuit 206 generates 10 modifiers. In this embodiment, the question determination circuit 208 may determine the 5 "best" modifiers and generate 5 additional questions based on the 5 best modifiers and the original input question 104. To generate the "best" modifiers, the question determination circuit 208 may identify how many times a specific modifier has been identified by mining circuit 206, and the modifiers may be ranked from the most identified modifiers to the least identified modifiers. Then, the question determination circuit 208 may generate additional questions for the n-most identified modifiers (e.g., the top 5 identified modifiers). Alternatively, the n-best modifiers may be identified utilizing any method.

Once the additional questions are generated by the question determination circuit 208, the question processing circuit 108 parses each of the additional questions using natural language processing techniques to extract major features from each of the additional questions which may then be used to decompose the each question into one or more queries that may be submitted to the databases 112 in order to generate one or more hypotheses. The submission of the queries results in the extraction of portions of the corpus of data/information matching the criteria of the particular query. These portions of the corpus are analyzed and used to generate a second set of candidate answers 210 for answering the additional questions. The second set of candidate answers 210 may include all of the candidate answers generated by each of the additional questions. Furthermore, each answer in the second set of candidate answers 210 may include the geospatial or temporal modifier utilized to generate the additional question that generated the answer. For example, if the modifier 2004 is utilized to generate an additional question, "Who did George Bush defeat in 2004?" then one answer for the additional question may be John Kerry. Then, the answer processing circuit 110 may be configured to append a parenthetical to John Kerry in the second set of candidate answers 210 to include the modifier (e.g., "John Kerry (2004)").

The confidence score circuit 204 may generate confidence scores for each of the answers contained in the first set of candidate answers 202 and for each of the answers contained in the second set of candidate answers 210. The confidence score circuit 204 may synthesize the large number of relevance scores generated by the various reasoning algorithms into confidence scores for the various answers in the first and second set of candidate answers 202 and 210. For example, confidence score circuit 204 may generate a confidence score for each answer based on the number of documents 114 a candidate answer appears. This process may involve applying weights to the various scores. The weighted scores may be processed in accordance with a statistical model to generate a confidence score or measure for the individual answers.

In an example, the input question 104, "Who did George Bush defeat?" may generate a first set of candidate answers 202 that includes John Kerry, Al Gore, John McCain, Alain Keyes, Garry Mauro, Ann Richards, and Michael Dukakis. Because so many potential answers may be correct, the confidence score circuit 204 may generate confidence scores that are generally lower than confidence scores that a more specific question may elicit. Thus, confidence score circuit 204 may generate a confidence score of 30% for John Kerry and 10% for Ann Richards from the first candidate answer set 202. However, after the answer processing circuit 110 generates the second candidate answer set 210 the confidence scores may increase. For example, the additional question, "Who did George Bush defeat in 2004?" may produce an answer John Kerry (2004) which has a much higher confidence score (e.g., 90%) than the corresponding John Kerry that was generated based on an answer to the original input question 104 in the first candidate answer set 202. Similarly, the confidence score for the additional question, "Who did George Bush defeat in Texas" may produce an answer Ann Richards (Texas) which has a higher confidence score (e.g., 40%) than the corresponding Ann Richards answer from the first candidate answer set 202. The second candidate answer set 210 may include multiple answers that correspond to a single answer from the first candidate answer set 202. Continuing the previous example, an additional question may also be, "Who did George Bush defeat in 1994?" Thus, the answer processing circuit 110 may generate an answer Ann Richards (1994) that corresponds with the Ann Richards answer from the first candidate answer set 202 in addition to the Ann Richards (Texas). The confidence score circuit 204 is configured to generate a confidence score for each of the Ann Richards answers in the second candidate answer set 210.

The sort circuit 212 is configured to compare the confidence scores determined by the confidence score circuit 204 to generate a question answer set 214 to be returned to the user system 102. The question answer set 214 may include each of the answers from the first candidate answer set 202, the second candidate answer set 210, and/or a combination of answers from the first candidate answer set 202 and the second candidate answer set 210. In an embodiment, the sort circuit is configured to compare each answer in the first candidate answer set 202 with a corresponding answer or answers in the second candidate answer set 210 to determine which answer has the highest confidence score. Of the corresponding answers, the answer with the highest confidence score may be included in the question answer set 214 while the remaining corresponding answers may be excluded from the question answer set 214. For example, the sort circuit 212 may compare John Kerry from the first candidate answer set 202 with a confidence score of 30% to John Kerry (2004) from the second candidate answer set 210 with a confidence score of 90%. Because John Kerry (2004) from the second candidate answer set 210 has a higher confidence score, John Kerry (2004) is included in the question answer set 214 while John Kerry from the first candidate answer set is excluded from the question answer set 214. Similarly, the confidence score of 10% for Ann Richards from the first candidate answer set 202 may be compared to the confidence score of 40% for Ann Richards (Texas) from the second candidate answer set 210 and the confidence score of 70% for the Ann Richards (1994) from the second candidate answer set 210. Because Ann Richards (1994) from the second candidate answer set 210 has the highest confidence score of the corresponding Ann Richards answers, Ann Richards (1994) is included in the question answer set 214 while Ann Richards and Ann Richards (Texas) is excluded from the question answer set 214.

Once the question answer set 214 is generated, the sort circuit 212 may also be configured to sort the confidence scores of the answers in the question answer set 214. In an embodiment, the sort circuit 212 may sort the confidence scores of the question answer set 214 from the greatest confidence score to the least confidence score and return the question answer set 214 to the user system 102 in order from greatest confidence score to least confidence score. In alternative embodiments, the question answer set 214 may be returned to the user system 102 in any order. In this manner, a user of the user system 102 may be provided high quality answers to an ambiguous input question 104. Furthermore, because the geospatial and/or temporal modifiers may be included in many of the returned answers as part of question answer set 214, the user may be provided additional information that the user may utilize to best understand the provided answers and/or to help the user to reformulate an input question with additional information.

Figure 3:
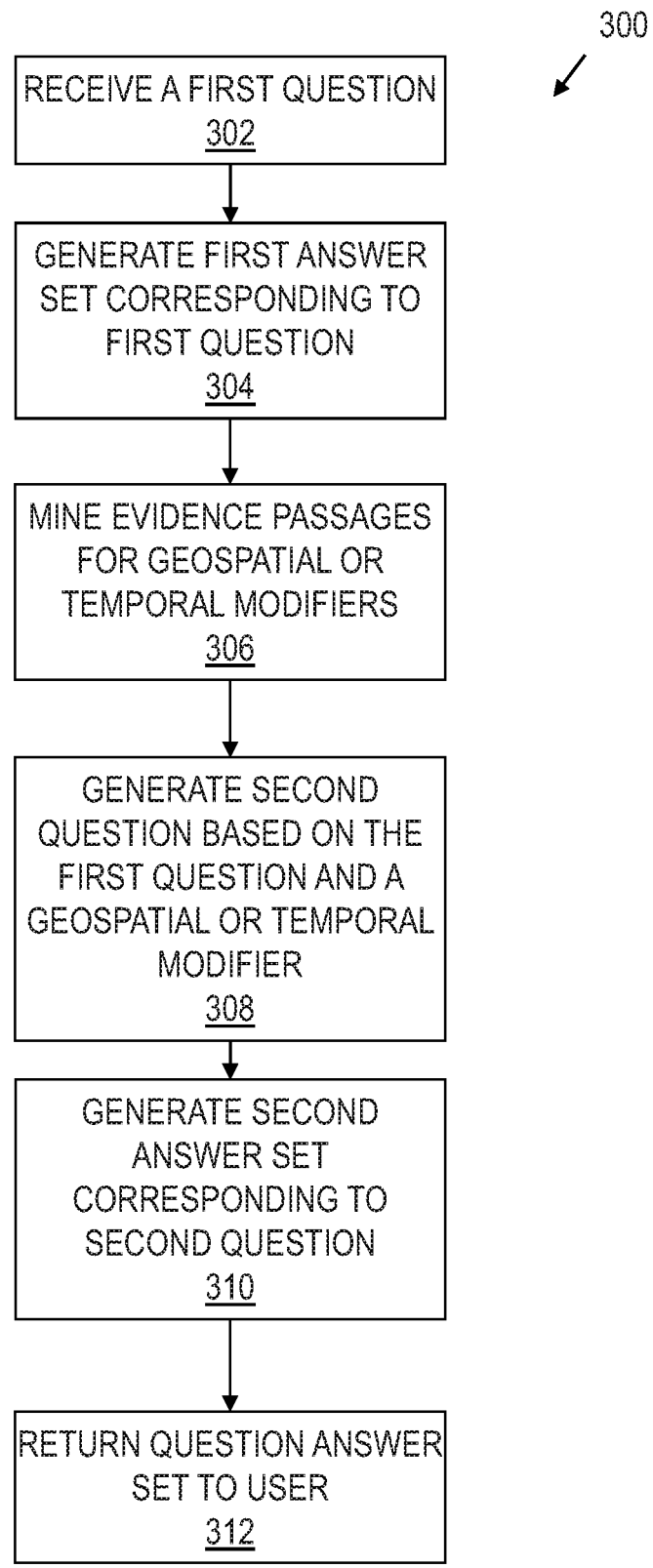
FIG. 3 shows a flow diagram illustrating aspects of operations that may be performed to answer natural language questions utilizing a question answering system in accordance with various embodiments.

FIG. 3 shows a flow diagram illustrating aspects of operations that may be performed to answer natural language questions utilizing a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the system 100.

The method 300 begins in block 302 with receiving a first question, such as input question 104. The first question may be received by a question answering system, such as question answering system 106, from a user system, such as user system 102. More particularly, the first question may be received by a question processing circuit, such as question processing circuit 108. In block 304, the method 300 continues with generating a first answer set corresponding to the first question. For example, the question processing circuit may parse the first question and generate one or more queries that may be submitted to one or more databases, such as databases 112, in order to generate one or more hypotheses. The submission of the queries results in the extraction of portions of the corpus of data/information matching the criteria of the particular query. These portions of the corpus are analyzed and used to generate, in some embodiments by an answer processing circuit, such as answer processing circuit 110, the first answer set, such as first candidate answer set 202.

The method 300 continues in block 306 with mining evidence passages for geospatial and/or temporal modifiers. For example, a mining circuit, such as mining circuit 206, may crawl evidence passages associated with each answer of the first answer set for geospatial and/or temporal modifiers. In block 308, the method 300 continues with generating a second question based on the first question and a geospatial and/or temporal modifier. For example, a question determination circuit, such as question determination circuit 208, may combine the first question with any of the mined geospatial and/or temporal modifiers mined to generate a second question to be provided to the question processing circuit in order to query the databases.

The method 300 continues in block 310 with generating a second answer set corresponding to the second question. For example, the question processing circuit may parse the second question and generate one or more queries that may be submitted to the databases in order to generate one or more hypotheses. The submission of the queries results in the extraction of portions of the corpus of data/information matching the criteria of the particular query. These portions of the corpus are analyzed and used to generate, in some embodiments by the answer processing circuit, the second answer set, such as second candidate answer set 210.

In block 312, the method 300 continues with returning a question answer set to a user. For example, the answer processing circuit may generate a question answer set, such as question answer set 214, by sorting confidence scores of answers in the first answer set and answers in the second answer set. The question answer set may include each of the answers from the first answer set, the second answer set, and/or a combination of answers from the first answer set and the second answer set. In some embodiments, of corresponding answers, the answer with the highest confidence score may be included in the question answer set while the remaining corresponding answers may be excluded from the question answer set.

Figure 4:
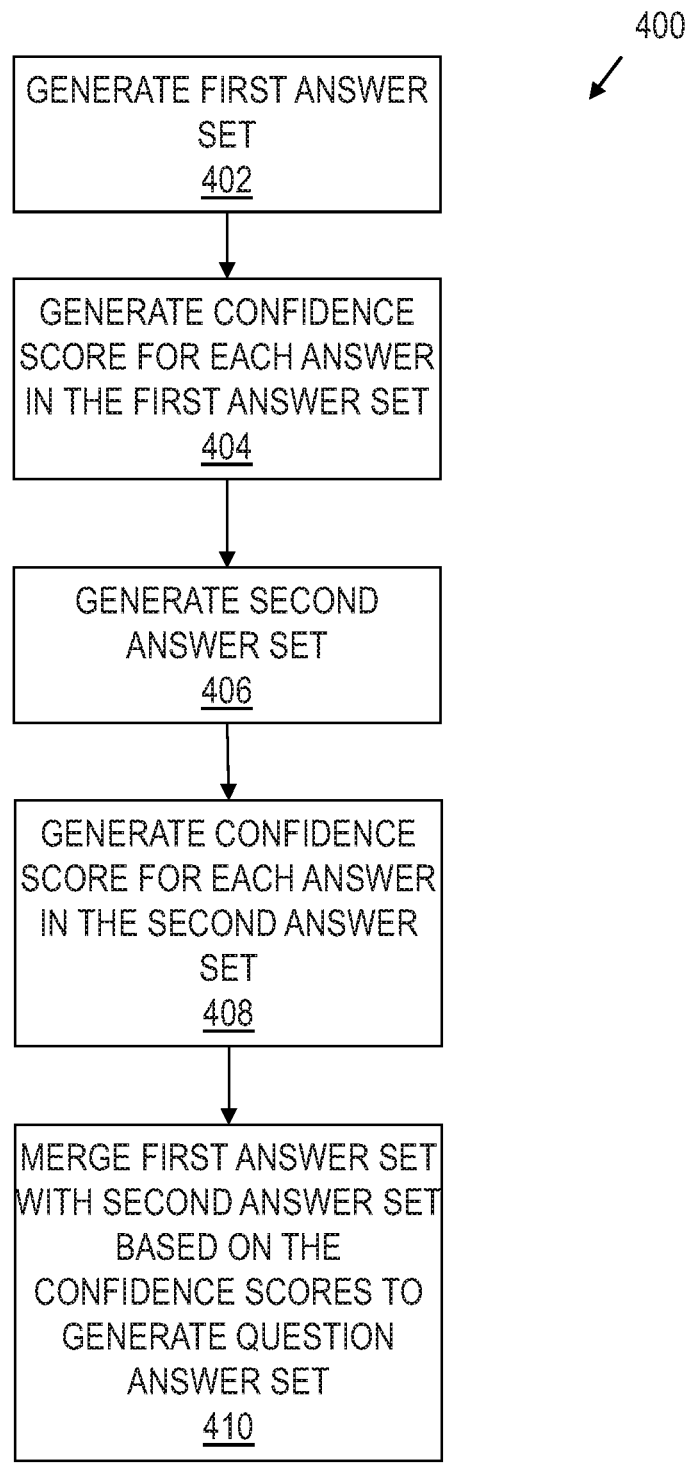
FIG. 4 shows a flow diagram illustrating aspects of operations that may be performed to answer natural language questions utilizing a question answering system in accordance with various embodiments.

FIG. 4 shows a flow diagram illustrating aspects of operations that may be performed to answer natural language questions utilizing a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the system 100.

The method 400 begins in block 402 with generating a first answer set. For example, a first question may be received by a question answering system, such as question answering system 106, from a user system, such as user system 102. More particularly, the first question may be received by a question processing circuit, such as question processing circuit 108. The question processing circuit may parse the first question and generate one or more queries that may be submitted to one or more databases, such as databases 112, in order to generate one or more hypotheses. The submission of the queries results in the extraction of portions of the corpus of data/information matching the criteria of the particular query. These portions of the corpus are analyzed and used to generate, in some embodiments by an answer processing circuit, such as answer processing circuit 110, the first answer set, such as first candidate answer set 202.

In block 404, the method 400 continues with generating a confidence score for each answer in the first answer set. For example, a confidence score circuit, such as confidence score circuit 204, may synthesize the large number of relevance scores generated by the various reasoning algorithms into confidence scores for the various answers in the first answer set. The weighted scores may be processed in accordance with a statistical model to generate a confidence score or measure for the individual answers.

The method 400 continues in block 406 with generating a second answer set. For example, a mining circuit, such as mining circuit 206, may crawl evidence passages associated with each answer of the first answer set for geospatial and/or temporal modifiers. A question determination circuit, such as question determination circuit 208, may combine the first question with any of the mined geospatial and/or temporal modifiers to generate a second question to be provided to the question processing circuit in order to query the databases. The question processing circuit may parse the second question and generate one or more queries that may be submitted the databases in order to generate one or more hypotheses. The submission of the queries results in the extraction of portions of the corpus of data/information matching the criteria of the particular query. These portions of the corpus are analyzed and used to generate, in some embodiments by the answer processing circuit the second answer set, such as second candidate answer set 210.

In block 408, the method 400 continues with generating a confidence score for each answer in the second answer set. For example, the confidence score circuit may synthesize the large number of relevance scores generated by the various reasoning algorithms into confidence scores for the various answers in the second answer set. The weighted scores may be processed in accordance with a statistical model to generate a confidence score or measure for the individual answers.

The method 400 continues with merging the first answer set with the second answer set based on the confidence scores to generate a question answer set. For example, a sort circuit, such as sort circuit 212, may be configured to compare the confidence scores determined by the confidence score circuit. The question answer set may include each of the answers from the first answer set, the second answer set, and/or a combination of answers from the first answer set and the second answer set. In an embodiment, the sort circuit is configured to compare each answer in the first answer set with a corresponding answer or answers in the second answer set to determine which answer has the highest confidence score. Of the corresponding answers, the answer with the highest confidence score may be included in the question answer set while the remaining corresponding answers may be excluded from the question answer set.

Figure 5:
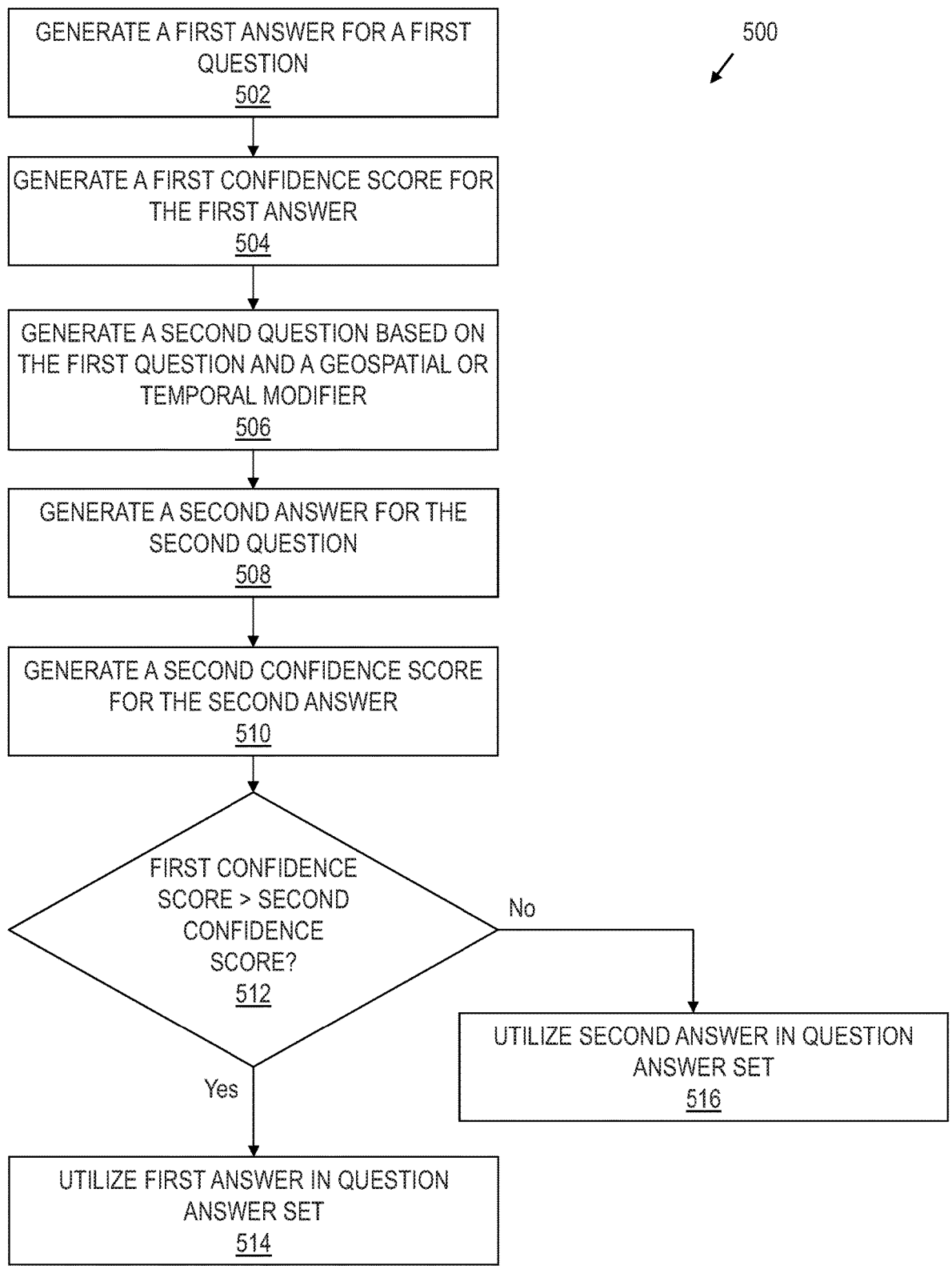
FIG. 5 shows a flow diagram illustrating aspects of operations that may be performed to answer natural language questions utilizing a question answering system in accordance with various embodiments.

FIG. 5 shows a flow diagram illustrating aspects of operations that may be performed to answer natural language questions utilizing a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the system 100.

The method 500 begins in block 502 with generating a first answer for a first question. For example, a first question may be received by a question answering system, such as question answering system 106, from a user system, such as user system 102. More particularly, the first question may be received by a question processing circuit, such as question processing circuit 108. The question processing circuit may parse the first question and generate one or more queries that may be submitted to one or more databases, such as databases 112, in order to generate one or more hypotheses. The submission of the queries results in the extraction of portions of the corpus of data/information matching the criteria of the particular query. These portions of the corpus are analyzed and used to generate, in some embodiments by an answer processing circuit, such as answer processing circuit 110, the first answer, which may be a part of a first answer set, such as first candidate answer set 202.

In block 504, the method 500 continues with generating a confidence score for the first answer. For example, a confidence score circuit, such as confidence score circuit 204, may synthesize the large number of relevance scores generated by the various reasoning algorithms into a confidence score for the first answer. The weighted score may be processed in accordance with a statistical model to generate a confidence score or measure for the first answer.

The method 500 continues in block 506 with generating a second question based on the first question and a geospatial and/or temporal modifier. For example, a mining circuit, such as mining circuit 206, may crawl evidence passages associated with the first answer for geospatial and/or temporal modifiers. A question determination circuit, such as question determination circuit 208, may combine the first question with any of the mined geospatial and/or temporal modifiers to generate a second question to be provided to the question processing circuit in order to query the databases.

In block 508, the method 500 continues with generating a second answer for the second question. For example, the question processing circuit may parse the second question and generate one or more queries that may be submitted the databases in order to generate one or more hypotheses. The submission of the queries results in the extraction of portions of the corpus of data/information matching the criteria of the particular query. These portions of the corpus are analyzed and used to generate, in some embodiments by the answer processing circuit, the second answer, which may be a part of a second answer set, such as second candidate answer set 210.

The method 500 continues in block 510 with generating a second confidence score for the second answer. For example, the confidence score circuit may synthesize the large number of relevance scores generated by the various reasoning algorithms into a confidence score for the second answer. The weighted score may be processed in accordance with a statistical model to generate a confidence score or measure for the second answer.

In block 512, the method 500 continues with determining whether the first confidence score is greater than the second confidence score. If, in block 512, a determination is made that the first confidence score is greater than the second confidence score, then the method 500 continues in block 514 with utilizing the first answer in the question answer set and, in some embodiments, excluding the second answer from the question answer set. However, if, in block 512, a determination is made that the first confidence score is not greater than the second confidence score, then the method 500 continues in block 516 with utilizing the second answer in the question answer set and, in some embodiments, excluding the first answer from the question answer set.

Figure 6:
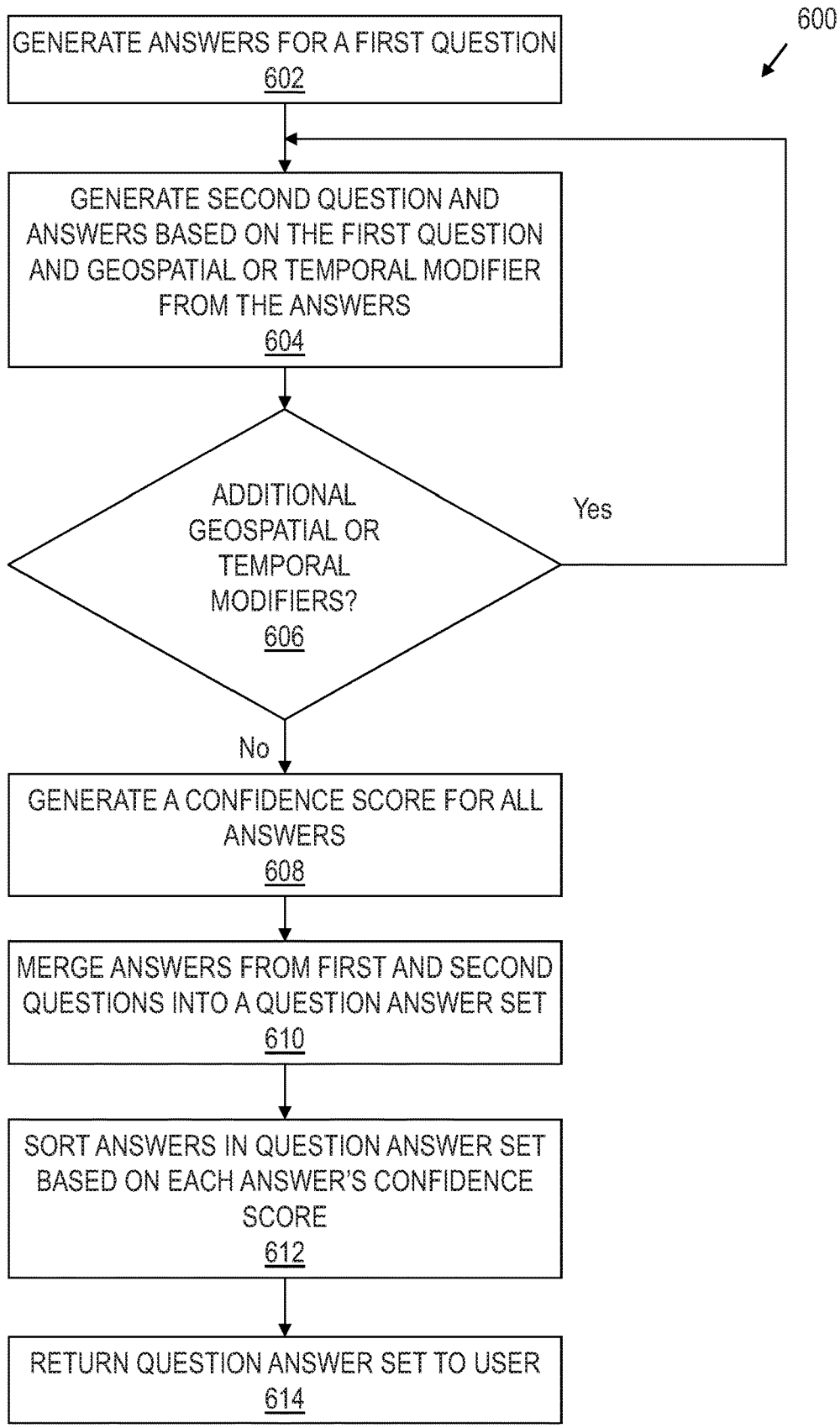
FIG. 6 shows a flow diagram illustrating aspects of operations that may be performed to answer natural language questions utilizing a question answering system in accordance with various embodiments.

FIG. 6 shows a flow diagram illustrating aspects of operations that may be performed to answer natural language questions utilizing a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the system 100.

The method 600 begins in block 602 with generating answers for a first question. For example, a first question may be received by a question answering system, such as question answering system 106, from a user system, such as user system 102. More particularly, the first question may be received by a question processing circuit, such as question processing circuit 108. The question processing circuit may parse the first question and generate one or more queries that may be submitted to one or more databases, such as databases 112, in order to generate one or more hypotheses. The submission of the queries results in the extraction of portions of the corpus of data/information matching the criteria of the particular query. These portions of the corpus are analyzed and used to generate, in some embodiments by an answer processing circuit, such as answer processing circuit 110, a first answer set, such as first candidate answer set 202.

In block 604, the method 600 continues with generating a second question and answers based on the first question and a geospatial and/or temporal modifier from the answers to the first question. For example, a mining circuit, such as mining circuit 206, may crawl evidence passages associated with the first answer set for a geospatial and/or temporal modifier. A question determination circuit, such as question determination circuit 208, may combine the first question with the mined geospatial and/or temporal modifier to generate a second question to be provided to the question processing circuit in order to query the databases. The question processing circuit may parse the second question and generate one or more queries that may be submitted the databases in order to generate one or more hypotheses. The submission of the queries results in the extraction of portions of the corpus of data/information matching the criteria of the particular query. These portions of the corpus are analyzed and used to generate, in some embodiments by the answer processing circuit, answers to the second question which may be a part of a second answer set, such as second candidate answer set 210.

The method 600 continues in block 606 with determining whether there are any additional geospatial and/or temporal modifiers in the evidence passages associated with the first answer set. If, in block 606, a determination is made that there are additional geospatial and/or temporal modifiers in the evidence passages associated with the first answer set, then the method 600 continues in block 604 with generating another question and answers based on the first question and the additional geospatial and/or temporal modifier.

However, if, in block 606, a determination is made that there are not additional geospatial and/or temporal modifiers in the evidence passages associated with the first answer set, then the method 600 continues in block 608 with generating a confidence score for all answers. For example, a confidence score circuit, such as confidence score circuit 204, may synthesize the large number of relevance scores generated by the various reasoning algorithms into confidence scores for the various answers in the first and second answer set. The weighted scores may be processed in accordance with a statistical model to generate a confidence score or measure for the individual answers.

In block 610, the method 600 continues with merging answers from the first and second questions into a question answer set. For example, a sort circuit, such as sort circuit 212, may be configured to compare the confidence scores determined by the confidence score circuit. The question answer set may include each of the answers from the first answer set, the second answer set, and/or a combination of answers from the first answer set and the second answer set. In an embodiment, the sort circuit is configured to compare each answer in the first answer set with a corresponding answer or answers in the second answer set to determine which answer has the highest confidence score. Of the corresponding answers, the answer with the highest confidence score may be included in the question answer set while the remaining corresponding answers may be excluded from the question answer set.

The method 600 continues in block 612 with sorting answers in the question answer set based on each answer's confidence score. For example, the sort circuit may sort the confidence scores of the question answer set from the greatest confidence score to the least confidence score. In block 614, the method 600 continues with returning the question answer set to a user. For example, the question answer set may be returned to the user system in order from greatest confidence score to least confidence score.

Figure 7:
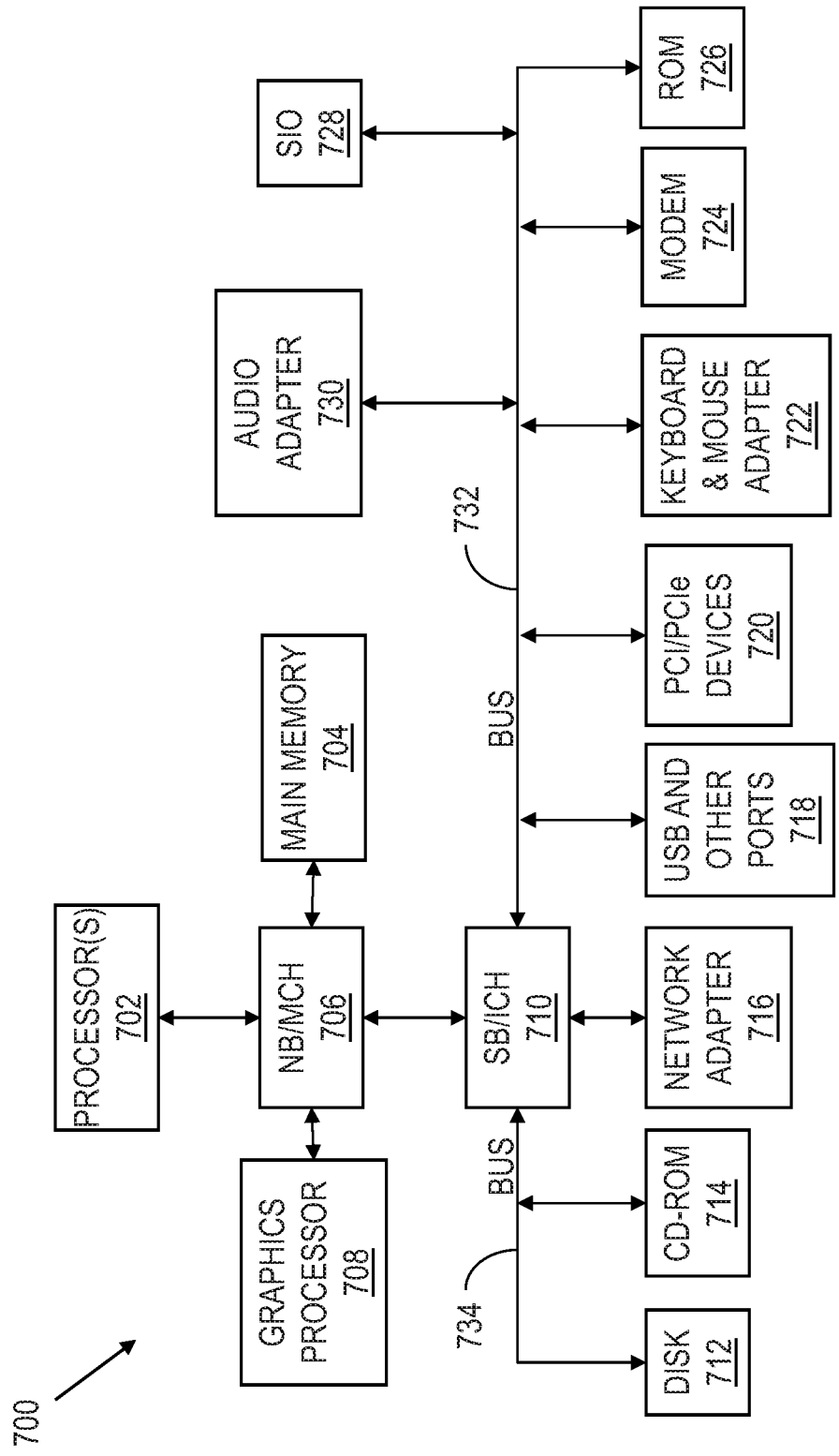
FIG. 7 shows an illustrative block diagram of an example data processing system that can be applied to implement embodiments of the present disclosure.

FIG. 7 is a block diagram of an example data processing system in which aspects of the illustrative embodiments may be implemented. Data processing system 700 is an example of a computer that can be applied to implement the user system 102 or the QA system system 106 in FIG. 1 and FIG. 2, in which computer usable code or instructions implementing the processes for illustrative embodiments of the present invention may be located. In one illustrative embodiment, FIG. 7 represents a computing device that implements the QA system 106 augmented to include the additional mechanisms of the illustrative embodiments described hereafter.

In the depicted example, data processing system 700 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP).

In the depicted example, local area network (LAN) adapter 716 connects to SB/ICH 710. Audio adapter 730, keyboard and mouse adapter 722, modem 724, read only memory (ROM) 726, hard disk drive (HDD) 712, CD-ROM drive 714, universal serial bus (USB) ports and other communication ports 718, and PCI/PCIe devices 720 connect to SB/ICH 710 through bus 732 and bus 734. PCI/PCIe devices may include, for example, Ethernet adapters, add-in cards, and PC cards for notebook computers. PCI uses a card bus controller, while PCIe does not. ROM 726 may be, for example, a flash basic input/output system (BIOS).

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. Super I/O (SIO) device 728 may be connected to SB/ICH 710.

An operating system runs on processor(s) 702. The operating system coordinates and provides control of various components within the data processing system 700 in FIG. 7. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

In some embodiments, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors 702. Alternatively, a single processor system may be employed.

Instructions for the operating system, the object-oriented programming system, and applications or programs are located on storage devices, such as HDD 712, and may be loaded into main memory 704 for execution by processor(s) 702. The processes for illustrative embodiments of the present invention may be performed by processor(s) 702 using computer usable program code, which may be located in a memory such as, for example, main memory 704, ROM 726, or in one or more peripheral devices 712 and 714, for example.

A bus system, such as bus 732 or bus 734 as shown in FIG. 7, may include one or more buses. The bus system may be implemented using any type of communication fabric or architecture that provides for a transfer of data between different components or devices attached to the fabric or architecture. A communication unit, such as modem 724 or network adapter 716 of FIG. 7, may include one or more devices used to transmit and receive data. A memory may be, for example, main memory 704, ROM 726, or a cache such as found in NB/MCH 706 in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a question processing circuit configured to:
      receive a first natural language question; and
      decompose the first natural language question into at least one database query;
   an answer processing circuit coupled to the question processing circuit and configured to:
      generate a first answer set corresponding to the first natural language question; and
      generate a first answer in the first answer set based at least in part on a text passage, wherein the text passage does not include the first natural language question, and wherein the text passage provides evidence supporting the first answer;
   a mining circuit coupled to the answer processing circuit and configured to mine the text passage to identify at least one modifier selected from the group consisting of a geospatial modifier in the text passage and a temporal modifier in the text passage; and
   a question determination circuit coupled to the mining circuit and configured to generate a second natural language question based on the first natural language question and the at least one modifier,
   wherein the answer processing circuit is further configured to:
      generate a second answer set corresponding to the second natural language question, wherein each answer of the second answer set includes the at least one modifier, and
      return a question answer set comprising the first answer set, the second answer set, or a combination of the first answer set and the second answer set to a user,
   wherein the answer processing circuit is further configured to generate a confidence score for each answer in the first answer set and each answer in the second answer set, and wherein the confidence score for the first answer in the first answer set is based on a first number of documents in which the first answer appears and the confidence score for the second answer in the second answer set is based on a second number of documents in which the second answer appears.

2. The system of claim 1, wherein the answer processing circuit is further configured to:
   compare the confidence score of the first answer in the first answer set to the confidence score of the second answer in the second answer set, the second answer corresponding to the first answer; and
   include the second answer in the question answer set and exclude the first answer from the question answer set in response to a determination that the second confidence score is greater than the first confidence score.

3. The system of claim 1, wherein the answer processing circuit is further configured to sort each answer in each answer set in the question answer set by confidence score.

4. The system of claim 3, wherein the answer processing circuit is further configured to return the question answer set in order of greatest confidence score answer to least confidence score answer.

5. A computer program product for generating answers to natural language questions, the computer program product comprising a computer readable storage medium having program instructions embodied therewith, the program instructions executable by a computer to cause the computer to:
   receive a first natural language question;
   decompose the first natural language question into at least one database query;
   generate, based at least in part on a text passage, a first answer in a first answer set corresponding to the first natural language question, wherein the text passage does not include the first natural language question, and wherein the text passage provides evidence supporting the first answer;
   mine the text passage to identify at least one modifier selected from the group consisting of a geospatial modifier in the text passage and a temporal modifier in the text passage;
   generate a second natural language question based on the first natural language question and the at least one modifier;
   generate a second answer set corresponding to the second natural language question, a second answer in the second answer set corresponding to the first answer, wherein each answer of the second answer set includes the at least one modifier;
   generate a confidence score for each answer in the first answer set and each answer in the second answer set, wherein the confidence score for the first answer in the first answer set is based on a first number of documents in which the first answer appears and the confidence score for the second answer in the second answer set is based on a second number of documents in which the second answer appears; and
   return a question answer set comprising the first answer set, the second answer set, or a combination of the first answer set and the second answer set to a user.

6. The computer program product of claim 5, wherein the program instructions are further executable by the computer to cause the computer to include the second answer in the question answer set in response to a determination that the second confidence score is greater than the first confidence score.

7. The computer program product of claim 6, wherein the second question includes the first question and the at least one modifier.

8. A computer-implemented question answering system, comprising:

a memory having instructions therein; and at least one processor in communication with the memory, wherein the at least one processor is configured to execute the instructions to:

receive a first natural language question;

decompose the first natural language question into at least one database query;

generate, based at least in part on a text passage, a first answer in a first answer set corresponding to the first natural language question, wherein the passage does not include the first natural language question, and wherein the text passage provides evidence supporting the first answer;

mine the text passage to identify at least one modifier selected from the group consisting of a geospatial modifier in the text passage and a temporal modifier in the text passage;

generate a second natural language question based on the first natural language question and the at least one modifier;

generate a second answer set corresponding to the second natural language question, a second answer in the second answer set corresponding to the first answer, wherein each answer of the second answer set includes the at least one modifier;

generate a confidence score for each answer in the first answer set and each answer in the second answer set, wherein the confidence score for the first answer in the first answer set is based on a first number of documents in which the first answer appears and the confidence score for the second answer in the second answer set is based on a second number of documents in which the second answer appears; and return a question answer set comprising the first answer set, the second answer set, or a combination of the first answer set and the second answer set to a user.

* * * * *